United States Patent [19]
Motoyama et al.

[11] Patent Number: 5,878,702
[45] Date of Patent: Mar. 9, 1999

[54] EXHAUST TIMING CONTROL DEVICE FOR TWO-CYCLE ENGINE

[75] Inventors: Yuh Motoyama; Takafumi Fukuda; Yoshihiko Moriya, all of Iwata, Japan

[73] Assignee: Yamaha Motor Corporation, Iwata, Japan

[21] Appl. No.: 387,935

[22] Filed: Aug. 1, 1989

[30] Foreign Application Priority Data

Aug. 2, 1988 [JP] Japan .................................. 63-194186

[51] Int. Cl.⁶ .................................................. F02B 75/02
[52] U.S. Cl. ....................................... 123/65 PE; 123/323
[58] Field of Search ................................ 123/65 PE, 323, 123/65 P, 65 EM

[56] References Cited

U.S. PATENT DOCUMENTS 4,621,596  11/1986  Uchinishi ............................ 123/65 PE

FOREIGN PATENT DOCUMENTS 0062917  4/1982  Japan .................................. 123/65 PE
0025030  2/1984  Japan .................................. 123/65 PE
0035020  2/1987  Japan .................................. 123/65 PE Primary Examiner—David A. Okonksy
Attorney, Agent, or Firm—Ernest A. Beutler

[57] ABSTRACT

An exhaust port controlling arrangement for an internal combustion engine having both main and auxiliary exhaust ports. A main control valve cooperates with the main exhaust port for varying the timing at which the exhaust port opens in response to engine speed. An on/off auxiliary control valve is positioned in a passage leading from the auxiliary exhaust port for opening and closing the flow through the auxiliary exhaust passage in response to an engine condition. Means retard the opening of the main exhaust port upon opening of the auxiliary exhaust ports to improve the power and torque curves of the engine.

8 Claims, 6 Drawing Sheets

EXHAUST TIMING CONTROL DEVICE FOR TWO-CYCLE ENGINE

BACKGROUND OF THE INVENTION

This invention relates to an exhaust timing control device for a two-cycle engine and more particularly to an improved arrangement for controlling the flow of exhaust gases from the combustion chamber of an internal combustion engine so as to achieve good performance under all running conditions.

Like many factors in engine design, the timing of exhaust port opening is generally a compromise between good performance at low speeds and good performance at high speeds. Recently, however, it has been determined that the performance of an engine can be increased at the maximum end without sacrificing low speed running if a control valve is utilized in conjunction with the exhaust port so as to delay opening of the exhaust port at low speeds and to cause it to open earlier at high speeds. Such exhaust port controls are frequently employed in conjunction with two-cycle internal combustion engines wherein a main control valve varies the timing of opening of the exhaust port.

In order to further increase the performance of engines, frequently multiple exhaust ports are employed. Where an auxiliary exhaust port is provided, it is also desirable to vary its opening and closing in response to engine running conditions so as to improve performance. In conjunction with two-cycle internal combustion engines and other engines, it is not always possible to put the control for the auxiliary exhaust port directly at the exhaust port. For this reason, prior art type of auxiliary port controls have been on/off type of devices.

In conjunction with the running of prior art engines having both main and auxiliary exhaust ports and controls for each of them with the auxiliary port control being an on/off type of control. It has been found that there is a dip or valley in the torque and power curve that occurs at the time when the auxiliary port control is moved from its closed to its opened position. This can be seen in the curve D in FIG. 1. This is a power to speed curve and it will be seen that at the time when the auxiliary port control opens at approximately 8,000 rpm, there is a dip in the power curve which will coincide with a dip in the torque curve.

It is, therefore, a principal object of this invention to provide an improved exhaust timing control system for engines that will increase the performance at high ends without sacrificing performance under any other running condition.

It is a further object of this invention to provide an improved port control arrangement for engines that will increase maximum performance without any dip in the torque curve or power curve.

It is a further object of this invention to provide an improved port controlling arrangement for two-cycle internal combustion engines.

SUMMARY OF THE INVENTION

This invention is adapted to be embodied in an exhaust port system for an internal combustion engine that is comprised of a main exhaust port for discharging combustion products from the engine and an auxiliary exhaust port for discharging combustion products from the engine. Means are provided for sequentially opening and closing of the exhaust ports during a complete cycle of engine operation. Auxiliary exhaust port control means are provided for selectively opening and closing an auxiliary exhaust passage communicating with the auxiliary exhaust port in response to an engine condition for selectively precluding combustion products from flowing the auxiliary exhaust port even when the auxiliary exhaust port is opened. Means are provided for retarding the effective time of opening of the main exhaust port upon operation of the auxiliary exhaust port control means for providing a smoother power curve.

DETAILED DESCRIPTION OF THE PREFERRED EMBODIMENT

Figure 2:
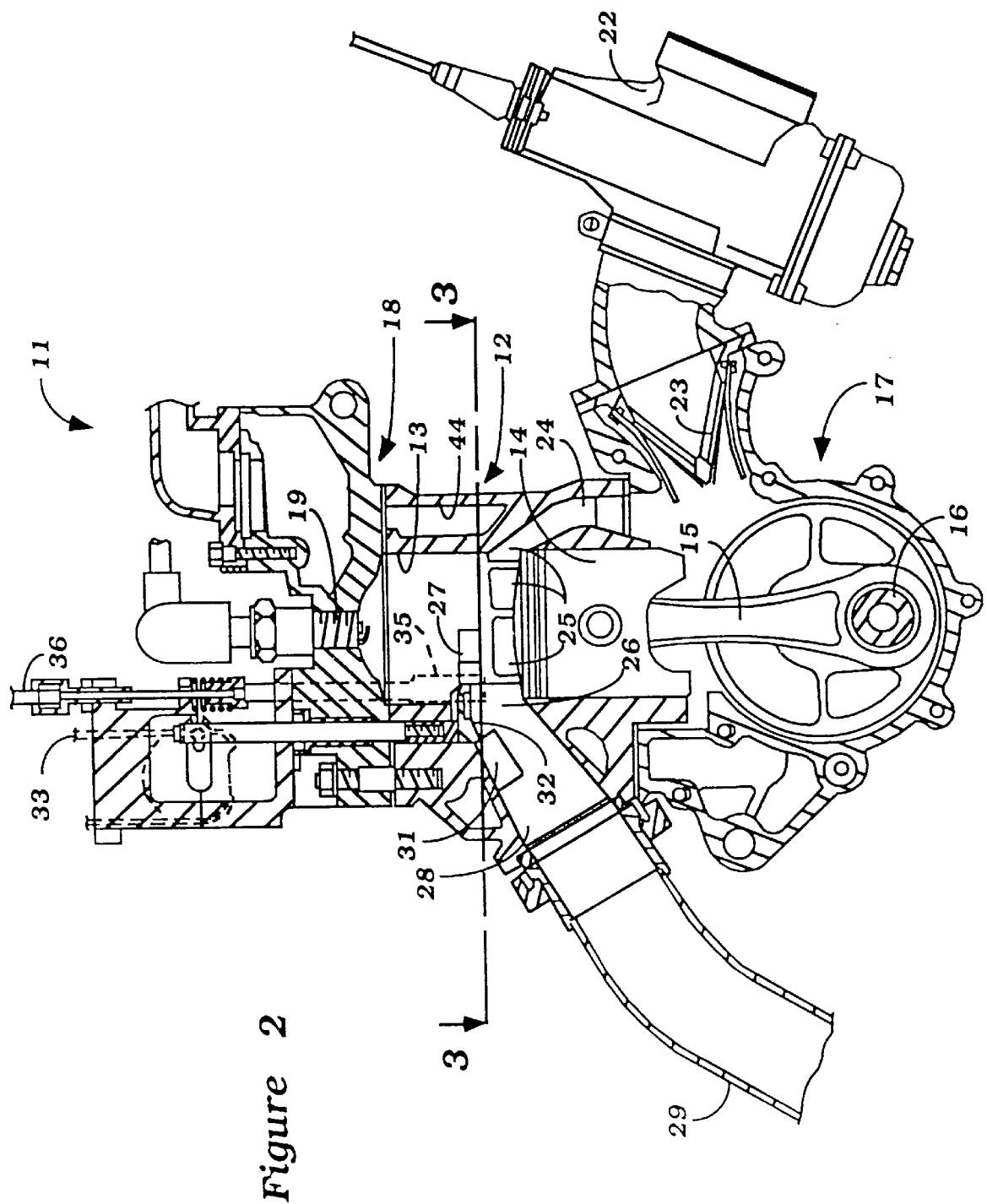
FIG. 2 is a cross-sectional view taken through a single cylinder of an internal combustion constructed in accordance with an embodiment of the invention.
Figure 3:
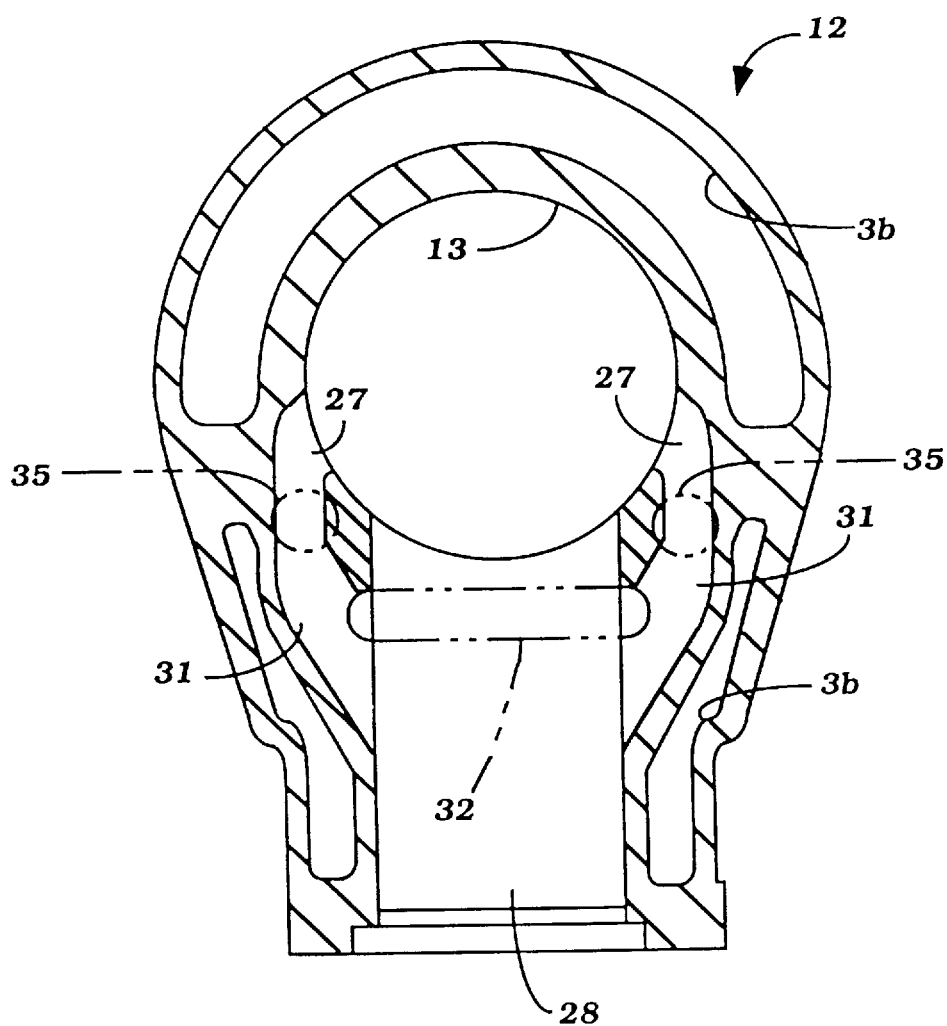
FIG. 3 is an enlarged cross-sectional view taken generally along the line 3—3 of FIG. 2.

Referring now in detail to the drawings and initially primarily to FIGS. 2 and 3, an internal combustion engine constructed in accordance with an embodiment of the invention is identified generally by the reference numeral 11. Only a single cylinder engine is depicted because it is believed that those skilled in the art can readily understand how the invention can be practiced in conjunction with multiple cylinder engines. Also, although a reciprocating engine is shown, it is to be understood that certain facets of the invention may be employed in conjunction with other types of engines. The engine 11 is, in the illustrated and preferred embodiment, of the two-cycle crank case compression type. Certain facets of the invention, however, may also be applied to engines operating on other principals such as four strokes cycle engines.

The engine 11 is comprised of a cylinder block 12 having a cylinder bore 13 in which a piston 14 reciprocates. The piston 14 is connected to a connecting rod 15 for driving crankshaft 16 that is rotatably journaled in a crankcase chamber defined by the cylinder block 12 and a crankcase member 17.

Figure 5:
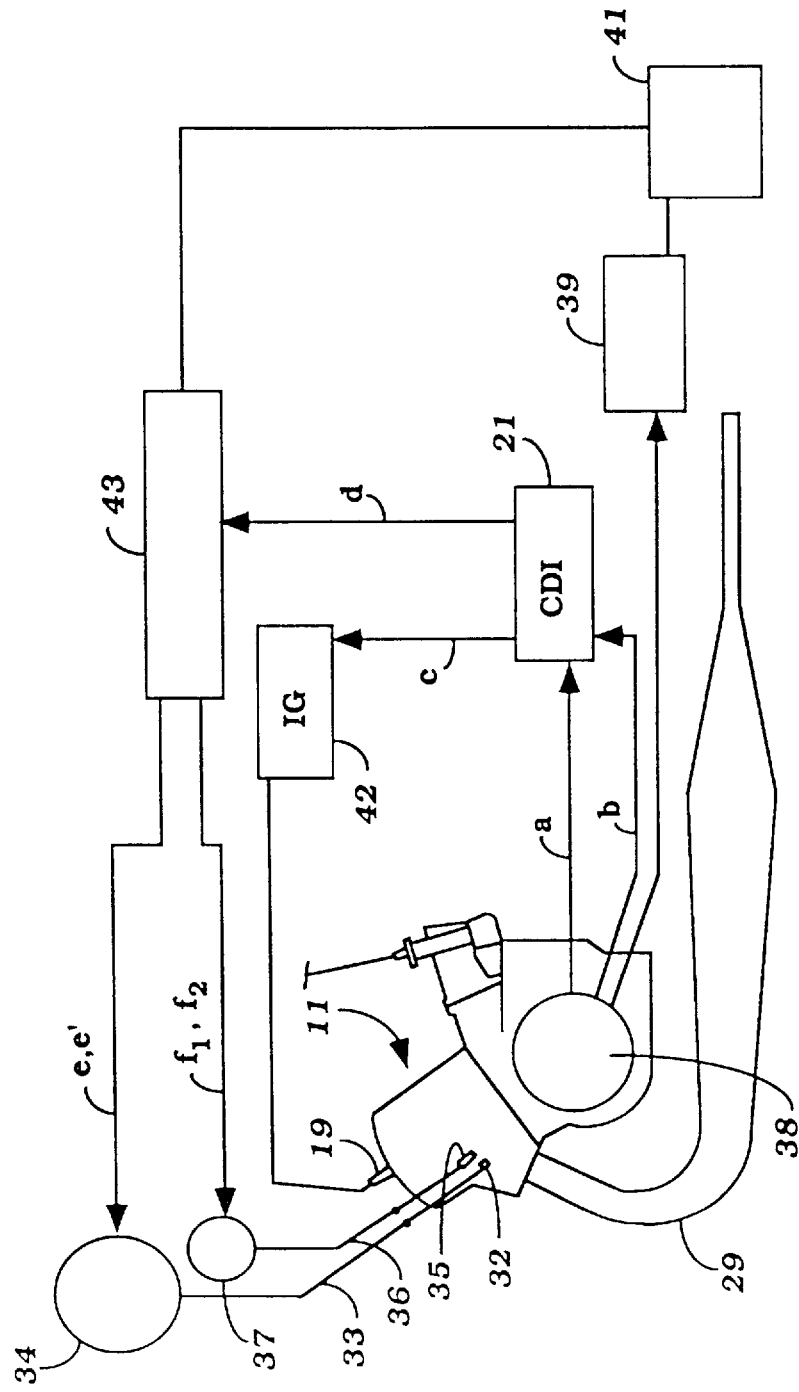
FIG. 5 is a schematic view showing the complete engine and its controls in schematic fashion.

A cylinder head 18 is affixed to the cylinder block 12 in a known manner and supports a spark plug 19 which is fired by a capacitor discharge ignition system indicated generally at 21 in FIG. 5.

A fuel air charge is delivered to the crankcase chamber in which the crankshaft 16 rotates from a suitable charge-forming device such as a carburetor 22. The carburetor 22 communicates with the crankcase chamber via a reed type check valve 23 so as to prevent reserve flow.

Figure 4:
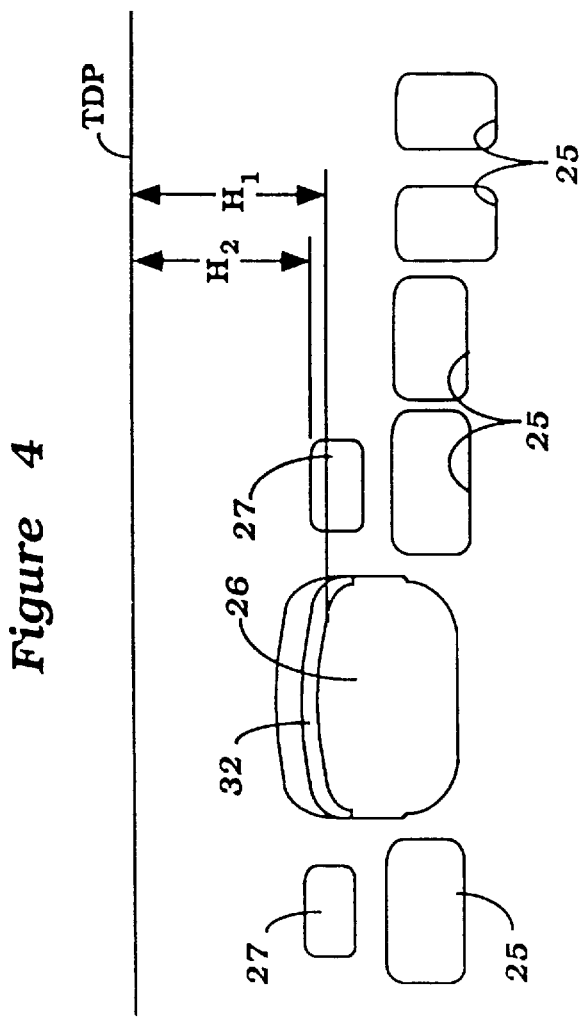
FIG. 4 is a developed view showing the porting arrangement for the engine.

The charge which is compressed in the crankcase chamber during the descent of the piston 14 is transferred to the area above the piston through a plurality of scavenged passages 24 that extend from the crankcase chamber and which terminate in scavenge ports 25 spaced around the periphery of the cylinder bore 13 in a pattern as shown in FIG. 4.

The burnt charge is exhausted from the combustion chamber through a main exhaust port 26 and a pair of auxiliary exhaust ports 27 having a configuration and layout as also shown best in FIG. 4. It should be noted that the main exhaust port 26 is considerably larger than the auxiliary exhaust ports 27 and will open at an earlier time during the piston travel on its exhaust stroke and close at a later time than the auxiliary ports 27. The configuration illustrated has been found to provide maximum power under high output conditions. However, as is well known, the exhaust porting that provides maximum power will provide poor running at low speeds. For this reason, there is provided a control valve arrangement that will now be described.

As may be best seen in FIG. 3, the main exhaust port 26 communicates with a main exhaust passageway 28 which, in turn, communicates with an exhaust pipe 29 for discharging the exhaust gases to the atmosphere after having passed through a silencer (not shown). The auxiliary exhaust ports 27 each communicate with respective auxiliary exhaust passages 31 which merge in their downstream ends with the main exhaust passage 28.

A main control valve 32 is slidably supported in the cylinder head and cylinder block and has a valving portion that is adapted to obstruct a portion of the exhaust port 26 as best shown in FIG. 4. As the main control valve 32 is lowered from the fully opened position to the position shown in FIG. 4 the timing at which the main exhaust port 26 effectively opens will be retarded. By retarding the opening of the main exhaust port 26 at low and mid-range speeds the running of the engine will be improved since the high overlaps that provide maximum power also provide poor running at low speeds. The main control valve 32 is connected by means of a Boden wire cable 33 to an appropriate actuator, shown schematically at 34 in FIG. 5. The actuator 34 may be of any known type of servo device for effecting the movement of the main control valve 32.

As may be seen clearly from FIG. 3, there are provided a pair of auxiliary control valves 35 in the auxiliary exhaust passages 31. Because of the configuration of the exhaust port and cylinder block it is not practical to put the auxiliary control valves 35 in direct registry with the auxiliary exhaust ports 27. For this reason, the auxiliary control valves 35 are on/off valves in that they are either fully opened or fully closed.

A Boden wire cable 36 connects the auxiliary control valves 35 to a remote actuator shown schematically at 37 in FIG. 5. The auxiliary control actuator 37 may be of any known type of servo device.

Referring now to FIG. 5, the control mechanism for the main control valve 32 and auxiliary control 35 will be described. It will be noted that the engine 11 is provided with a magneto generator, indicated generally by the reference numeral 38, which outputs a charging current to a voltage regulator 39 which, in turn, charges a battery 41. In addition, the magneto generator 38 includes a trigger coil that outputs a trigger pulse a to the capacitor discharge ignition system 21 for initiating firing of the spark plug 19 through an ignition coil 42. As is well known in this art, the ignition coil 42 discharges when with a voltage signal c from a capacitor which has been charged from a generating coil of the magneto generator 38, which charging coil output is designated at b.

Because of the output of the pulser coil a or the generating coil b, the capacitor discharge ignition circuit 21 can also output a signal d that is indicative of the speed at which the engine 11 is operated. This engine speed signal is transferred to a computer circuit shown schematically at 43 that is programmed with the control for the main exhaust control valve 32 and the auxiliary exhaust control valves 35. These control signals include a timing varying signal e that is transmitted to the servo motor 34 for the main control valve 32 and either an opening control signal $f_1$ or a closing control signal $f_2$ to the servo motor 37 for the auxiliary control valves 35.

Figure 6:
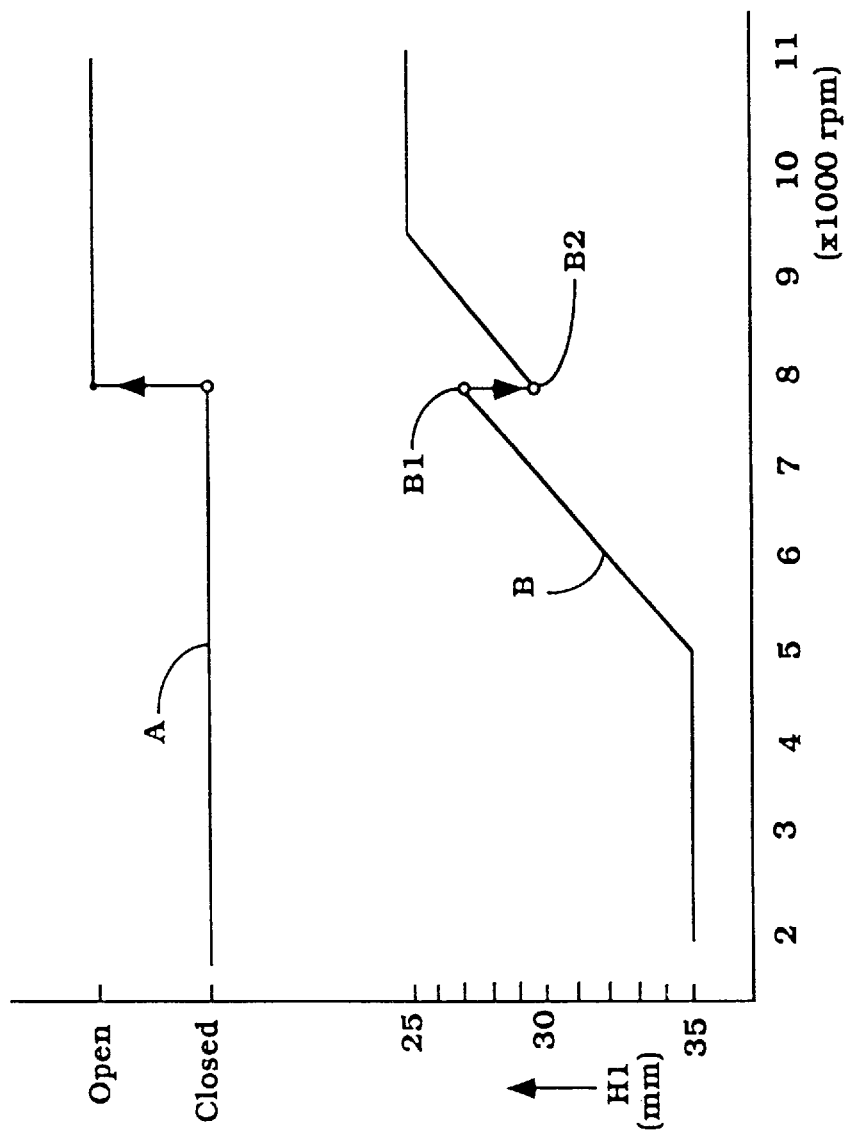
FIG. 6 is a graphical view showing the exhaust port timing of the main and auxiliary exhaust ports in accordance with an embodiment of the invention.

Although a wide variety of sequensive operations may be employed in conjunction with the invention, a particular sequence is shown in FIG. 6 which is fairly typical of the way the invention may be practiced. As will be noted from the curve A, the auxiliary control valves 35 are normally maintained in a closed position until the engine reaches a predetermined speed, 8,000 rpm in the illustrated embodiment, at which time the valves 35 are fully opened. On the other hand, the main control valve 32 is normally held in its lower most position $H_1$ which provides the maximum retard of the opening of the main exhaust port 26 at low and mid-range speeds. At some speed, 5,000 rpm in the illustrated embodiment, the main control valve 32 is opened with a ramp like function until the valve is fully opened at some pre-determined higher range speed.

Figure 1:
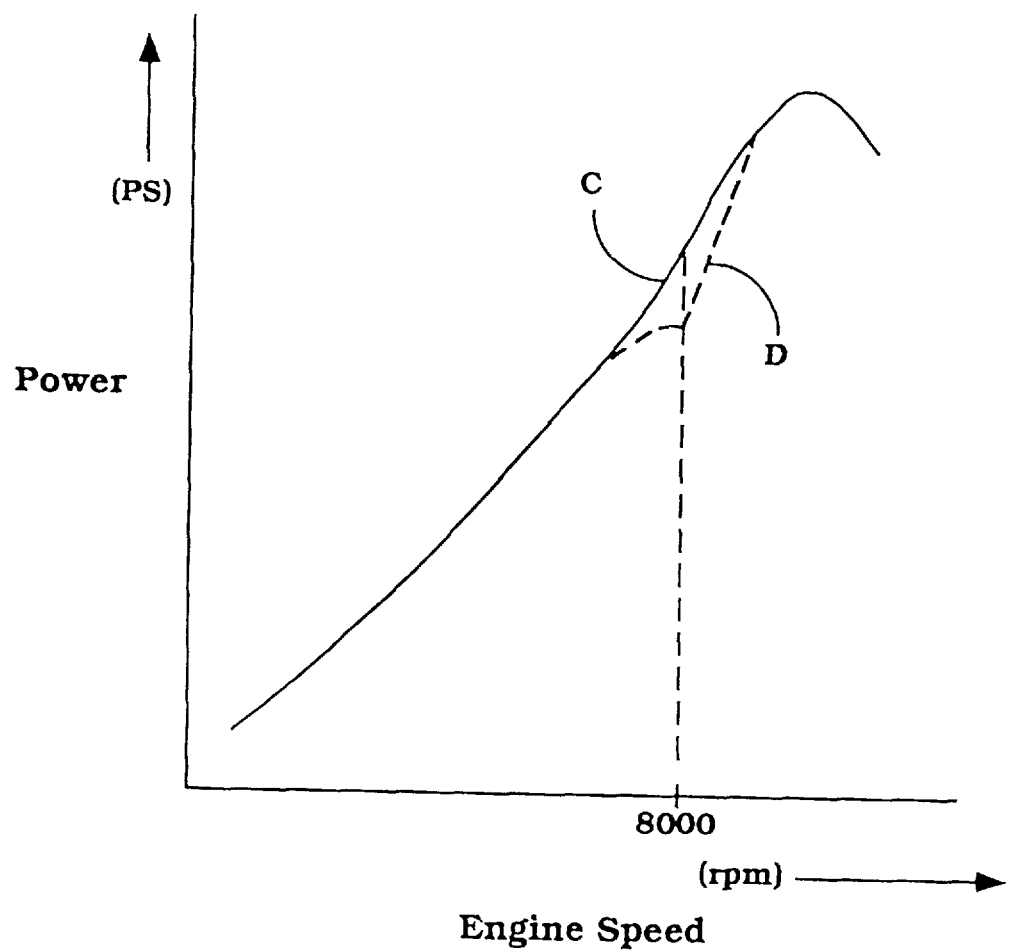
FIG. 1 is a graphical view showing engine speed in relation to power with the curve D representing the prior art type of construction in the curve C representing the power curve of an engine constructed in accordance with an embodiment of the invention.

However, in accordance with the invention and to avoid the torque or power dip as shown by the curve D in FIG. 1, at about the time the auxiliary control valves 35 are moved to their opened position, the degree of opening of the main control valve 32 is retarded or moved back toward its fully retarded position as shown by the line B-1 B-2. This modifying signal to the servo motors 34 is shown at e' wherein the control signal is delayed or retarded from what would be the normal condition at the speed at Which the auxiliary control valves 35 are open. As a result, it has been found that the torque curve and power curve will be smooth as shown by the curve C in FIG. 1. The control main control valve 32 then is continued open as on a ramp function as before until it is fully opened at, for example, 9,000 rpm in the illustrated example.

In the illustrated embodiment, the engine 11 is water-cooled and for this reason the cylinder block 12 is provided with a cooling jacket 44. The remainder of the cooling system for the engine 11 can be considered to be conventional and since it forms no part of the invention, further description or illustration of it is not believed to be required to enable those skilled in the art to make and use the invention.

It should be apparent from the foregoing description that the described valving arrangement for the exhaust ports permits the attainment of very high power outputs without any sacrifice in low and mid-range performance. Although an embodiment of the invention has been illustrated and described, various changes and modifications may be made without departing from the spirit and scope of the invention, as defined by the appended claims.

We claim:

1. An exhaust port system for an internal combustion engine comprising a main exhaust port for discharging combustion products from said engine, an auxiliary exhaust port for discharging combustion products from said engine, means for sequentially opening and closing said exhaust ports during a complete cycle of engine operation, an auxiliary exhaust port control means for selectively opening and closing an auxiliary exhaust passage communicating with said auxiliary exhaust port in response to an engine condition for selectively precluding combustion products from flowing through said auxiliary exhaust port even when said auxiliary port is open, and means for retarding the effective timing of the opening of said main exhaust port upon the operation of said auxiliary exhaust port control means for providing a smooth power curve.

2. An exhaust port system as set forth in claim 1 wherein the means for retarding the effective time of opening of the main exhaust port comprises a main exhaust control valve cooperating with said main exhaust port.

3. An exhaust port system as set forth in claim 2 further including means for controlling the operation of the main control valve in response to an engine operating condition.

4. An exhaust port system as set forth in claim 3 wherein the main control valve is normally positioned in a fully retarded condition when the engine is operating at low speeds and an unretarded condition when the engine is operating at high speeds with a ramp function therebetween for progressively decreasing the amount of retardation as the engine speed increases.

5. An exhaust port system as set forth in claim 1 wherein the engine is a two-cycle crankcase compression internal combustion engine and wherein a piston controls the opening and closing of the main and auxiliary exhaust ports.

6. An exhaust port system as set forth in claim 5 wherein the means for retarding the effective time of opening of the main exhaust port comprises a main exhaust control valve cooperating with said main exhaust port.

7. An exhaust port system as set forth in claim 6 further including means for controlling the operation of the main control valve in response to an engine operating condition.

8. An exhaust port system as set forth in claim 7 wherein the main control valve is normally positioned in a fully retarded condition when the engine is operating at low speeds and an unretarded condition when the engine is operating at high speeds with a ramp function therebetween for progressively decreasing the amount of retardation as the engine speed increases.

* * * * *